G. T. PARSLEY.
COMBINATION TOOL.
APPLICATION FILED DEC. 14, 1908.
971,012.
Patented Sept. 20, 1910.
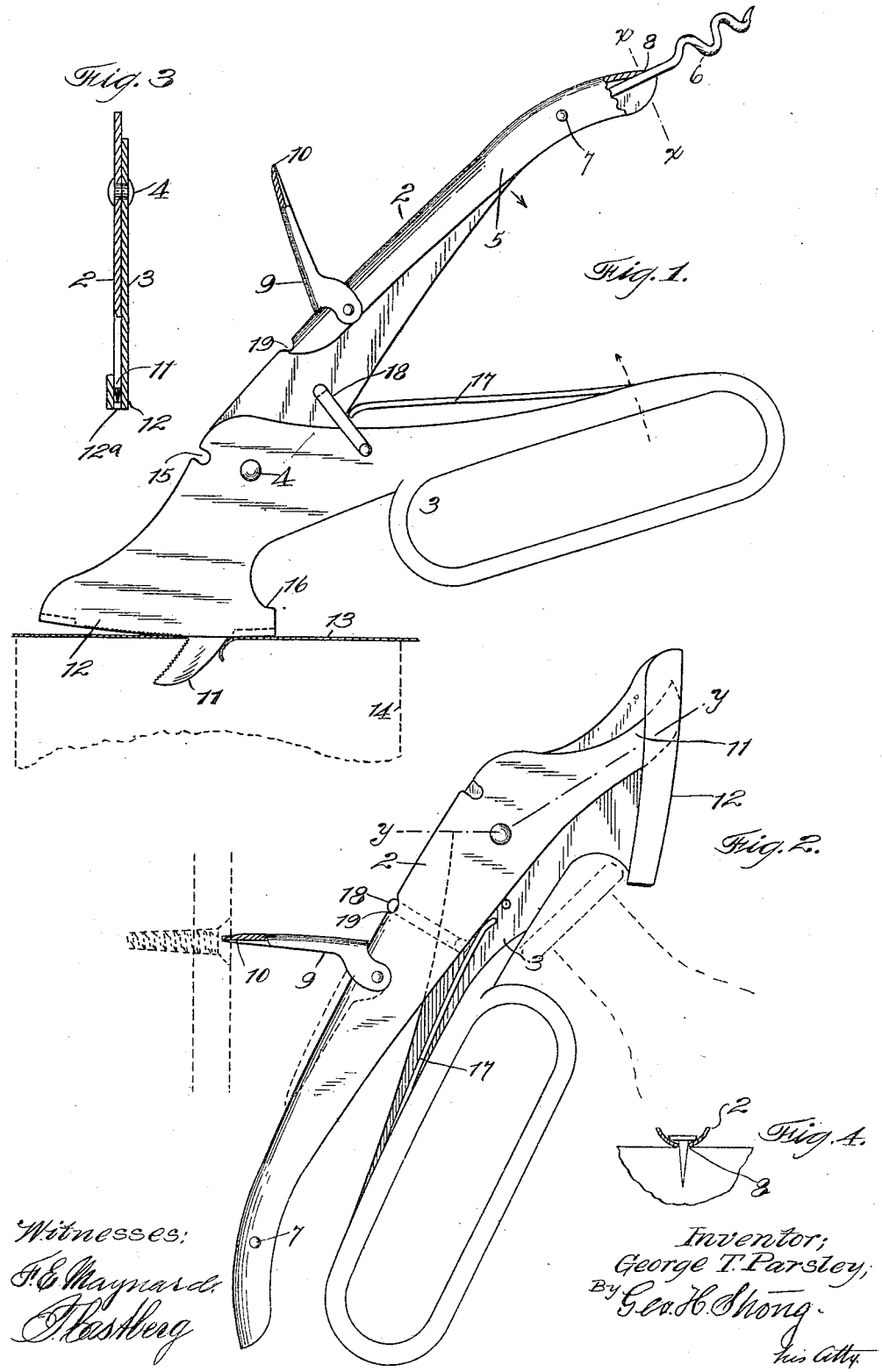

UNITED STATES PATENT OFFICE.

GEORGE T. PARSLEY, OF HORNBROOK, CALIFORNIA.

COMBINATION-TOOL.

971,012.

Specification of Letters Patent. Patented Sept. 20, 1910.

Application filed December 14, 1908. Serial No. 467,443.

*To all whom it may concern:*

Be it known that I, GEORGE T. PARSLEY, citizen of the United States, residing at Hornbrook, in the county of Siskiyou and State of California, have invented new and useful Improvements in Combination-Tools, of which the following is a specification.

My invention relates to a combination tool and it consists of the parts, and the construction and combination of parts, or their equivalents, as will be set forth in the following specification and accompanying drawings, in which—

Figure 1 is a side elevation of the device as applied to one of its purposes. Fig. 2 is an obverse view of the device closed, and also shown in some of its applications. Fig. 3 is a detail section on line *y—y* of Fig. 2. Fig. 4 is a detail section on line *x—x* of Fig. 1.

In the mode and operation of my invention as actually in use, I provide two fulcrumed lever members 2 and 3 respectively, preferably made of light sheet steel, or any other suitable metal or material, and pivoted together as at 4. The lever or handle 2 is provided at its longer portion with a down-turned flange 5; this down-turned flange serving to form an easy and comfortable grip portion for the handle 2; and it also serves to shield a corkscrew 6 which may be turned up under the down-turned portion 5 of the handle. The corkscrew is shown as pivoted at 7, and may be turned about its pivot so as to extend outwardly from the handle 2 so as to be readily adaptable for the removal of corks from bottles, or for other similar purposes. The down-turned portion 5 of the handle 2 is slotted as at 8 for a slight portion of its length, contiguous to its end, in such a manner as to reinforce or support the corkscrew 6, whe this member is in open position. This slotted portion 8 of the handle 2 also serves as a tack puller, as is shown in Fig. 4.

Approximately midway between the pivot 4, and the end of the handle 2, is pivoted a guard 9, which is adapted to be raised as shown in Fig. 1, in which position it serves to protect the hand against accident, when the tool is being used, and also gives additional purchase to the hand upon the lever. The outer end of this guard 9 may be somewhat pointed, as shown at 10 so as to be of use as a screw-driver, or any similar purpose, when desired. Obviously this guard 9 may be turned down upon the handle 2, as shown in dotted line in Fig. 2, when it is not desired to use it for either of the above purposes. The lower end 11 of the lever 2 is adapted to project down, when the handle is opened, as shown in Fig. 1, through and beneath a coöperative slotted portion 12 of the lower handle 3, in such a manner that as the two levers are drawn together about their pivot 4, the lower member 11 of the lever 2 is drawn up toward and through the slotted portion 12, until it is entirely inclosed by such portion. As shown in Fig. 3, this portion 12 of the handle 3, has a flattened right angular extension along its lower surface, in which is a slot 12ª, and through which the cutter 11 passes. As shown in Fig. 1, this portion 11 acts as a cutter after it has been thrust through the materials to be acted upon or cut, such for instance as the strip of material 13, as the handles 2 and 3 are operated. A particular function of this portion of the tool is its adaptability to be used as a stencil-making tool. When it is desired to use it in this manner, it is only necessary to force the point, which is suitably sharpened at its end, through the material to be cut, and as the handles are oscillated, and the tool pushed forward, a cut may be made in the material which will correspond in width to the width of the cutter 11. The lower surface of the coöperative cutter 12, and the upper surface of the cutter 11 are both suitably roughened or notched, so that the material to be cut will not slip from the cutter as it is operated. By the use of these roughened surfaces quite heavy material may be operated upon.

I have shown in dotted lines 14 a can, into the head of which the cutter has been thrust, and by oscillating or lifting the handle 3 in such a manner as to use the can top as a fulcrum, the cutter 11 may be made to continue to cut around the top of the can, in the manner of an ordinary can-opener.

It will be noticed that these two operations or functions are quite distinct from each other, for when the tool is used as a stencil-making device, the two levers are grasped between the palm of the hand and the four fingers, while the sheet of material to be operated upon is held in the left hand; whereas when the device is used as a can-opener, the cutter 11 is punched through the can top, and the lower handle 3 is grasped and lifted, and pushed around the top of the can, forcing the cutter 11 to rip or tear the material so as to open the can. The two levers 2 and 3 are preferably quite wide contiguous to the pivot 4 so as to prevent undue play of these two parts, and properly guide and stiffen them when in operation. Contiguous to the pivot 4 I have shown two alining notches 15, one in each handle 2 and 3, which may when desired be used as wire cutters, which is an important feature in a household tool.

I have shown at the rear portion of the cutter member 12, a shoulder 16 which is purposed to be used as a crown cap remover for bottles of the character using such crowns, and which it is sometimes quite difficult to remove unless a suitable tool is at hand. The peculiar design of the cutter member 12 affords a ready means whereby this removal of these bottle crowns may be obtained, as is shown in Fig. 2, the bottle being in dotted lines.

The tool is provided with a suitable spring 17 secured to the lower member 3, and effective to bear against the opposite member or handle 2, so as to normally maintain these members in an open position, and I have provided a suitable latch 18 which will engage a shoulder 19 formed upon the upper handle 2, when these two handles are closed together, so that the device may be made to occupy small space when packed for sale or shipment, and also made to occupy as little space as possible when the tool is in the possession of campers, tourists or the like; this feature being of considerable importance to this class of users.

Having thus described my invention, what I claim and desire to secure by Letters Patent is—

A tool of the character described comprising a pair of handles pivoted together shear fashion, one of said handles having a widened jaw at one end said jaw having a right-angled flange extension along its lower edge said extension being longitudinally slotted, and said other handle having a reduced jaw portion operating through the slot of the right-angled flange of the first-named jaw, said second jaw co-acting with the edge walls of said slot to shear material placed between the two jaws, said widened portion of the first-named handle having an extended rear portion forming a broad seating portion back of the second jaw portion.

In testimony whereof I have hereunto set my hand in presence of two subscribing witnesses.

GEORGE T. PARSLEY.

Witnesses:
 E. G. SMITH,
 A. H. JONES.